(12) United States Patent
Ogawa

(10) Patent No.: US 6,471,859 B1
(45) Date of Patent: Oct. 29, 2002

(54) INTERMITTENT MOVING LAYER TYPE CHROMATOGRAPHIC SEPARATION DEVICE

(75) Inventor: Yuji Ogawa, Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/787,544

(22) PCT Filed: Jul. 21, 2000

(86) PCT No.: PCT/JP00/04877

§ 371 (c)(1), (2), (4) Date: Jun. 22, 2001

(87) PCT Pub. No.: WO01/05482

PCT Pub. Date: Jan. 25, 2001

(30) Foreign Application Priority Data

Jul. 21, 1999 (JP) .......................................... 11-205728

(51) Int. Cl.⁷ .............................................. B01D 15/08
(52) U.S. Cl. ..................................... 210/198.2; 210/659
(58) Field of Search ................................. 210/635, 656, 210/659, 198.2; 137/625.11, 625.15, 625.46

(56) References Cited

U.S. PATENT DOCUMENTS 6,217,774 B1 * 4/2001 Nagamatsu ................. 210/659

FOREIGN PATENT DOCUMENTS

| EP | 655266 | 5/1995 | .............. 210/198.2 |
| EP | 878222 | 11/1998 | .............. 210/198.2 |
| JP | 04-131104 | 5/1992 | .............. 210/198.2 |
| JP | 10-128005 | 5/1998 | .............. 210/198.2 |

\* cited by examiner

*Primary Examiner*—Ernest G. Therkorn
(74) *Attorney, Agent, or Firm*—Sughrue Mion, PLLC

(57) ABSTRACT

The rotary member (12) of the rotary valve (10) includes columns (separation vessels) (14) coupled to each other to form an endless circular path (16) and rotates to separate components A and C from a feed liquid material containing two or more components. A concentration sensor (17) is connected to a tube (141) that connects between columns (14) and is mounted on the rotary member (12) rotatably in unison with the columns (14) to detect the concentration of the component A flowing in the circular path (16). Based on the detected result of the concentration sensor (17), fine tuning of the timing of start and the time length of each step can be effected, thereby providing an improved separation performance for the chromatographic separator.

1 Claim, 4 Drawing Sheets

Feed liquid material     Component C    Liquid eluent     Component A

Fig. 3

| Step | Step name | First selector valve | First pump | Valve 41 | Second selector valve | Second pump | Valve 51 | Time (second) |
|---|---|---|---|---|---|---|---|---|
| 1 | Introduction of D, Discharge of A | Circulation | Run | Open | Injection | Run | Close | 20 |
| 2 | Introduction of F, Discharge of A | Injection | Run | Open | Injection | Stop | Close | 20 |
| 3 | Circulation | Circulation | Run | Close | Circulation | Run | Close | 40 |
| 4 | Introduction of D, Discharge of C | Circulation | Stop | Close | Injection | Run | Open | 40 |
| 5 | Rotation of separation columns | Circulation | Stop | Close | Circulation | Stop | Close | 5 |

INTERMITTENT MOVING LAYER TYPE CHROMATOGRAPHIC SEPARATION DEVICE

REFERENCE TO RELATED APPLICATIONS

This application is a 371 of PCT/JP00/04877 filed Jul. 21, 2000.

FIELD OF THE INVENTION

The present invention relates to a chromatographic separator and more particularly to the concentration sensor disposed in an intermittently-moving-bed chromatographic separator.

BACKGROUND OF THE INVENTION

In manufacturing industries such as the sugar industry or the pharmaceutical industry, chromatographic separators are widely used to extract one or more components from fluid of a crude material consisting of a plurality of components and obtained from nature or through chemical reactions. Among the chromatographic separators, a variety of moving-bed separators have been proposed other than the batch fixed-bed separators conventionally used.

FIG. 4 is a schematic cross-sectional view illustrating a separation vessel, showing the principle of a typical chromatographic separator employing the moving-bed scheme. The separation vessel 60 is filled with a filler (adsorbent) 62 in advance, and is full of liquid eluent therein. A feed liquid material including two species of components A and C is introduced from a feed liquid material supply port F, and the liquid eluent is supplied from a liquid eluent supply port D at a constant linear speed. Each of the components A and C moves at different linear speeds within the separation vessel 60 due to the difference in affinity for the filler. For example, the component A having a lower affinity moves at a higher linear speed, whereas the component C having a higher affinity moves at a lower linear speed. Accordingly, by discharging the circulating liquid from two appropriate positions, the feed liquid material can be separated into a liquid containing more of the component A (hereinafter simply referred to as the component A) and a liquid containing more of the component C (hereinafter simply referred to as the component C).

A chromatographic separator employing the moving-bed scheme creates the movement of the filler, in the direction opposite to the flow of the liquid eluent, at a speed between the speed of movement of the component A and that of the component C. As shown in the figure, this makes it possible to take out the components at respective positions across the supply position of the feed liquid material. That is, as viewed from the direction of the flow of the circulating liquid, the component A can be taken out the feed liquid material supply position F and the component C can be taken out in front of the feed liquid material supply position F. In this scheme, since it is difficult to allow the filler to move at a uniform speed, it is not feasible to use this scheme in commercial applications.

A separator has been in practical use which is capable of obtaining the separation performance equivalent to that of a separator employing the foregoing moving-bed scheme, without allowing the filler to move. FIG. 5 illustrates the principle of this type of separator. In this scheme, the separation vessel 60 is divided into a plurality of columns 64 (twelve columns in the example of the figure), which are coupled to form an endless circular path. Instead of the movement of the filler, the feed liquid material supply position F and the liquid eluent supply position D and the discharge positions of the components A and C are shifted in the direction of flow of the liquid eluent. As time elapses, the distribution of the liquid in the system is shifted in the direction of the circulating liquid. When the concentration distribution has been shifted by a distance corresponding to one column after a certain period of time, the supply positions of the feed liquid material and the liquid eluent and the discharge positions of the components A and C are shifted in the direction of the circulating liquid by the distance corresponding to one column. The repetition of this operation makes it possible to supply and discharge each of the liquids at the optimum position at any time. Three schemes are employed to shift the supply positions of the feed liquid material and the liquid eluent and the discharge positions of the components A and C. The schemes, now in practical use, include a simulated moving-bed scheme in which liquid injection valves and liquid discharge valves, such as electromagnetic valves, are assembled and switched sequentially; another simulated moving-bed scheme in which a rotary valve having a number of nozzles is used and an intermittently-moving-bed scheme in which a rotary valve having a number of nozzles is used while moving the separation vessel.

The supply positions of the feed liquid material and the liquid eluent, and the discharge positions of the components A and C are preferably shifted or these steps are preferably switched in accordance with the concentration distributions of the components A and C in the circular path. That is, it is preferable to measure the concentration distribution in the circular path to adjust the positions for supplying and discharging the liquids and to adjust the timing for supplying the feed liquid material and the liquid eluent in accordance with the measured concentrations. Conventionally, however, such controls were typically performed in accordance with a specified time schedule instead.

A simulated moving-bed chromatographic separator, which uses the simulated moving-bed scheme employing a rotary valve having a number of nozzles, is described in Japanese Patent Laid-Open Publication No. Hei 9-206502. The simulated moving-bed chromatographic separator has a concentration sensor disposed between columns to correct the time schedule in accordance with a signal given from the concentration sensor. According to this scheme, the supply positions of the feed liquid material and the liquid eluent, the discharge positions of the components A and C, and the amount of supplied liquids can be controlled in accordance with the results of measurement of concentration. Thus, the separation efficiency of the chromatographic separator is improved.

The simulated moving-bed chromatographic separator described in the foregoing publication employs such a scheme so as to allow the columns to be stationary and the rotary valve to shift the positions for supplying and discharging each liquid. Thus, a concentration sensor can be readily installed in the circular path. However, in the intermittently-moving-bed chromatographic separator, which shifts the filled columns by using the rotary valve having a number of nozzles, in order for allowing the concentration sensor to be installed in an appropriate position between columns, it is necessary to install a dedicated rotary valve between a column and the concentration sensor to thereby introduce the liquid flow in the circular path to the concentration sensor.

Installation of the dedicated rotary valve for the concentration sensor, however, complicates the structure of the circular path of the chromatographic separator, raises the cost of the separator, and also degrades the separation performance. Consequently, no concentration sensor was conventionally used in this type of the chromatographic separator.

SUMMARY OF THE INVENTION

In view of the above, it is an object of the present invention to improve the intermittently-moving-bed chromatographic separator which shifts the filled columns by using a rotary valve having a number of nozzles, and to provide a chromatographic separator which is capable of improving the separation performance thereof by disposing a concentration sensor therein at an appropriate position to adjust the control of the separator in accordance with the results of the measurement by the concentration sensor.

The present invention provides an intermittently-moving-bed chromatographic separator including: a rotary valve including a stationary member having a substantially cylindrical or disc surface mounting thereon a plurality of stationary nozzles, and a rotary member having a rotary surface slidably rotating on said cylindrical or disc surface intermittently at a specified timing, said rotary surface mounting thereon rotary nozzles intermittently communicated with said stationary nozzles, said rotary member supporting at least four columns en bloc each having an inlet port and an outlet port so that said rotary nozzles are communicated with said inlet ports and said outlet ports, said stationary nozzles being coupled by a tube assembly to couple said columns in a circular path; first and second injection tubes for introducing a feed liquid material including first and second components and for introducing a liquid eluent, respectively; first and second discharge tubes coupled to said circular path to discharge said first and second components, respectively, from said first circular path; and a concentration sensor supported by said rotary member to be coupled to said circular path, said concentration sensor having an external terminal connected through a combination of slip-ring and a current collector to the outside.

The intermittently-moving-bed chromatographic separator according to the present invention is configured so that the concentration sensor is rotatably supported by the rotary member, and the leads from the concentration sensor are connected to the outside via slip rings and a current corrector. Therefore, the concentration sensor can be disposed at an appropriate position in the circular path and the fine control of the separator can be performed based on the results of measurement conducted therewith. Thus, the present invention can provide an improved separation performance for the intermittently-moving-bed chromatographic separator.

BRIEF DESCRIPTION OF THE DRAWINGS

FIG. 3 is a table showing the operational state of each component at each stage of the intermittently-moving-bed chromatographic separator of FIG. 1.

PREFERRED EMBODIMENT OF THE INVENTION

Figure 1:
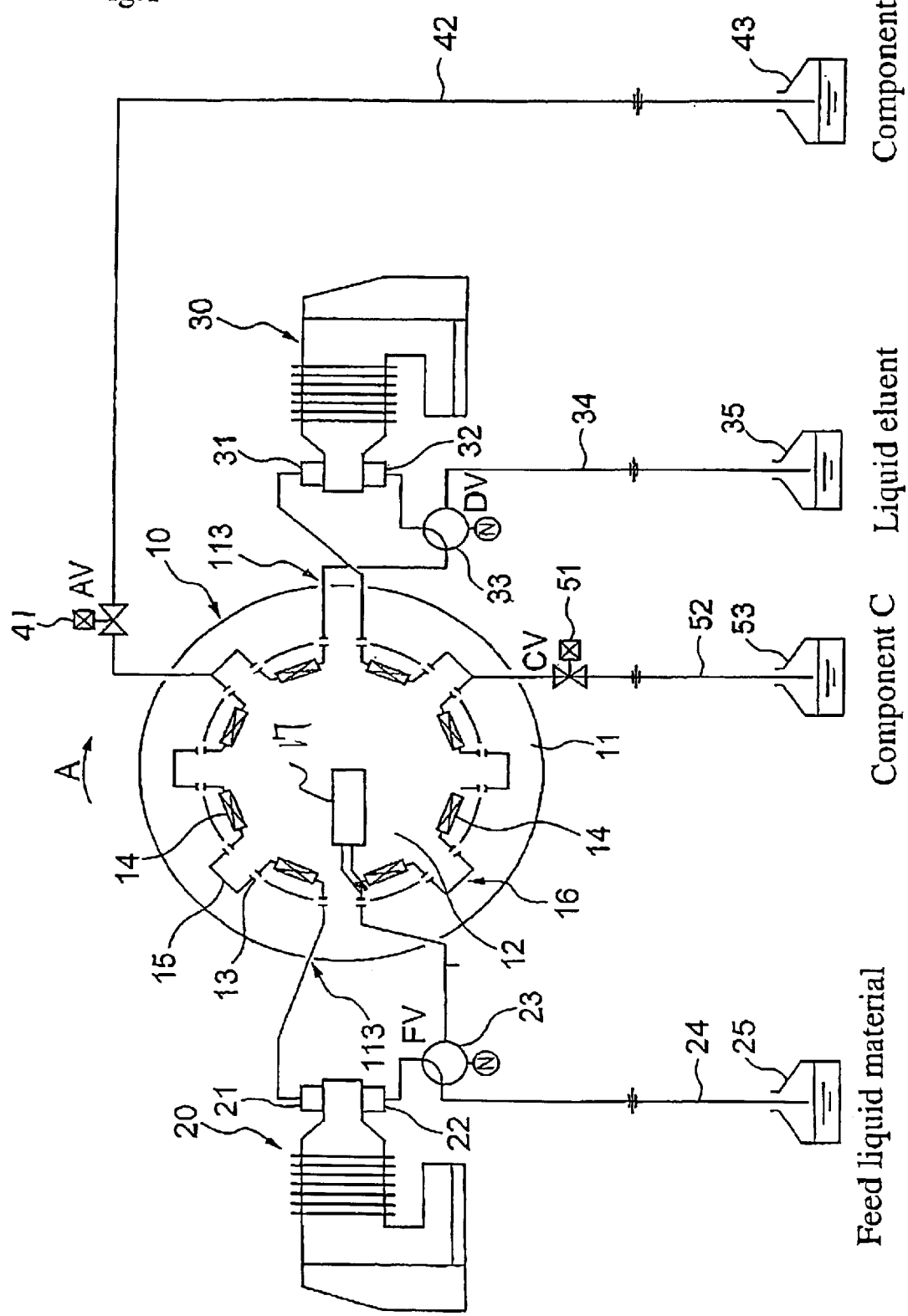
FIG. 1 is a block diagram illustrating an intermittently-moving-bed chromatographic separator according to an embodiment of the present invention.

Now, the present invention will be described in more detail in accordance with an embodiment of the present invention with reference to the drawings. FIG. 1 is a schematic block diagram illustrating the configuration of an intermittently-moving-bed chromatographic separator according to an embodiment of the present invention. The chromatographic separator is configured as such using an intermittent-moving-bed scheme wherein separation columns are shifted by using a rotary valve having a number of nozzles.

The separator has two pumps 20 and 30 and is provided with selector valves 23 and 33 for selecting either a circulation mode for connecting each of the pumps 20 and 30 into a circular path or a liquid injection mode for coupling a liquid injection tube 24 or 34 to the suction port of each of the pumps 20 and 30. In one of the steps of the separator, the first and second selector valves 23 and 33 are selected for the circulation mode, whereby eight columns (separation vessels) 14 filled with an adsorbent are coupled to one another via each of nozzles 13 of a rotary valve 10 and the first and second pumps 20 and 30 to thereby form an endless circular path 16. The liquid flows within the circulation path 16 in the direction "A" as shown in the figure (in the clockwise direction). The first and second pumps 20 and 30 serve as constant rate pumps, which provide an equal flow rate for the liquids.

The circular path 16 includes a first circular path half 16A including the first to fourth columns 14 from the delivery port 21 of the first pump 20 to the suction port 32 of the second pump 30, as viewed in the direction "A" of the liquid flow, and a second circular path half 16B including the fifth to eighth columns 14 from the delivery port 31 of the second pump 30 to the suction port 22 of the first pump 20. A feed liquid material tank 25 is coupled to the suction side 22 of the first pump 20 via a feed liquid material injection tube 24 and the first selector valve 23, and coupled to one end of the first circular path half 16A via the first pump 20. A liquid eluent tank 35 is coupled to the suction port 32 of the second pump 30 via a liquid eluent injection tube 34 and the second selector valve 33, and coupled to one end of the second circular path half 16B via the second pump 30 Each of the feed liquid material injection tube 24 and the liquid eluent injection tube 34 is coupled to the circular path 16 to inject a feed liquid material or a liquid eluent therethrough when the corresponding selector valve 23 or 33 is switched to the liquid injection mode.

A discharge tube 42 for the component A is coupled to the tube that couples the outlet port of the third column 14 to the inlet port of the fourth column 14 in the first circular path half 16A via a discharge valve 41 for the component A, and the end thereof is coupled to a tank 43 for the component A. A discharge tube 52 for the component C is coupled to the tube that couples the outlet port of the third column 14 to the inlet port of the fourth column 14 in the second circular path half 16B via a discharge valve 51 for the component C, and the end thereof is coupled to a tank 53 for the component C.

The concentration sensor 17 is coupled to the path between the outlet port of the eighth column 18 arranged at the end of the second circular path half 16B and the corresponding nozzle 13, to measure the concentration or the purity of the component A or C. The type of the concentration sensor 17 is determined depending on the type of the component A or C. Examples of the concentration sensor include concentration sensors using electromagnetic waves, such as near-ultraviolet rays, ultraviolet rays, visible rays, infrared rays, and far-infrared rays, a concentration sensor using a differential refractometer, a turbidimeter and a ultrasonic wave, a concentration sensor using ion electrodes, a concentration sensor utilizing a pH meter, and a concentration sensor using optical rotation.

Figure 2:
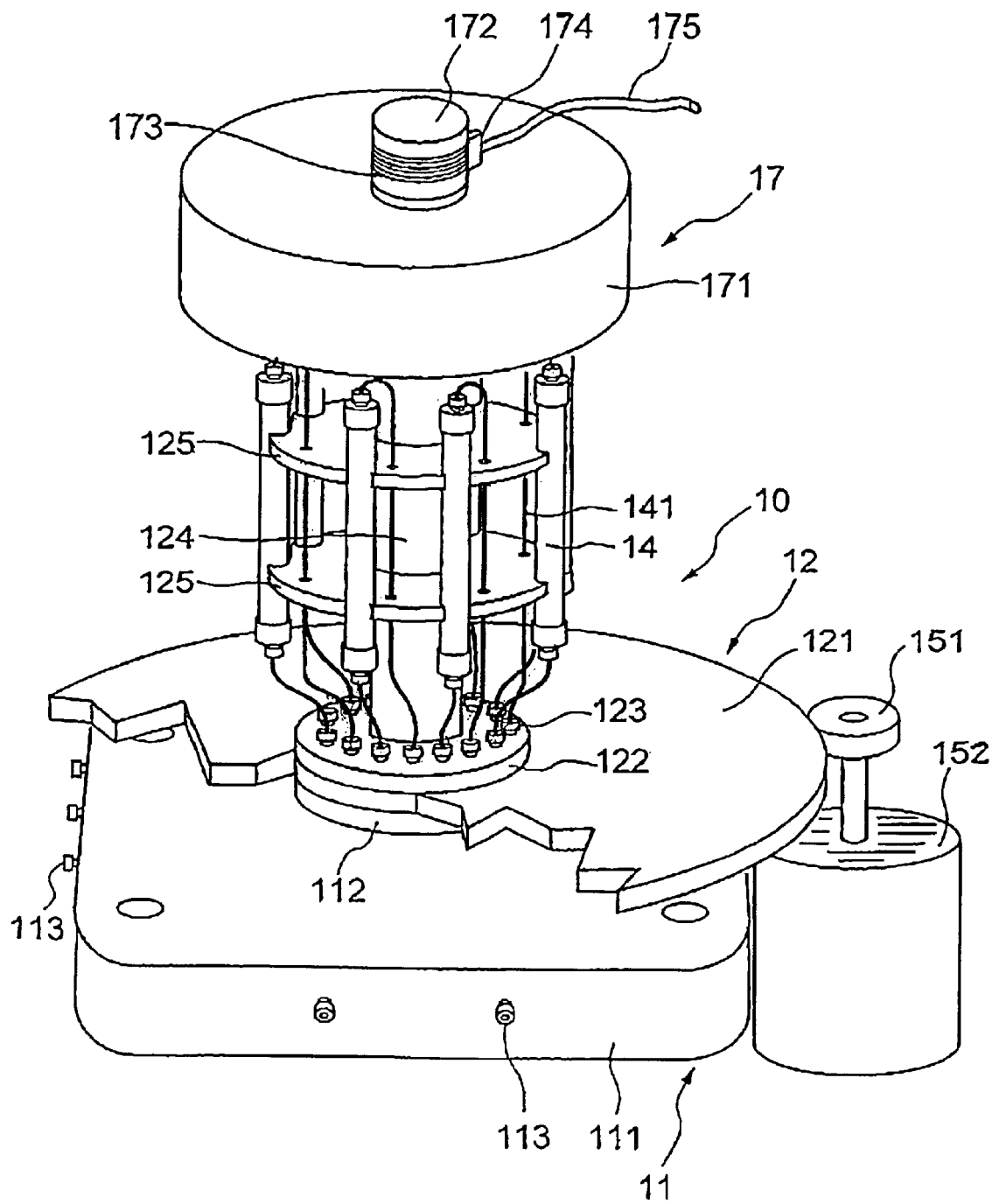
FIG. 2 is a schematic perspective view illustrating the vicinity of a rotary valve of the intermittently-moving-bed chromatographic separator of FIG. 1.
Figure 4:
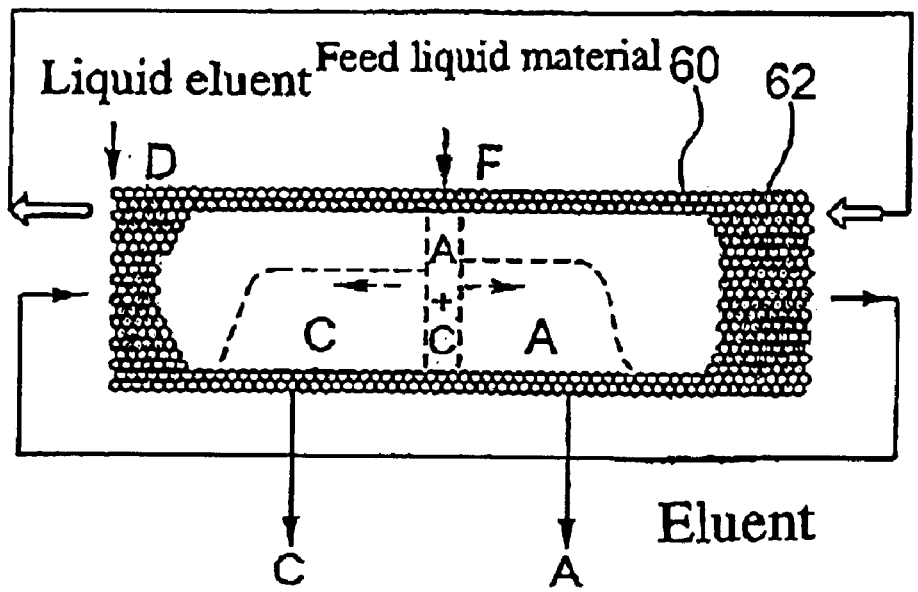
FIG. 4 is a schematic cross-sectional view of a separation vessel, showing the principle of a typical intermittently-moving-bed chromatographic separator.
Figure 5:
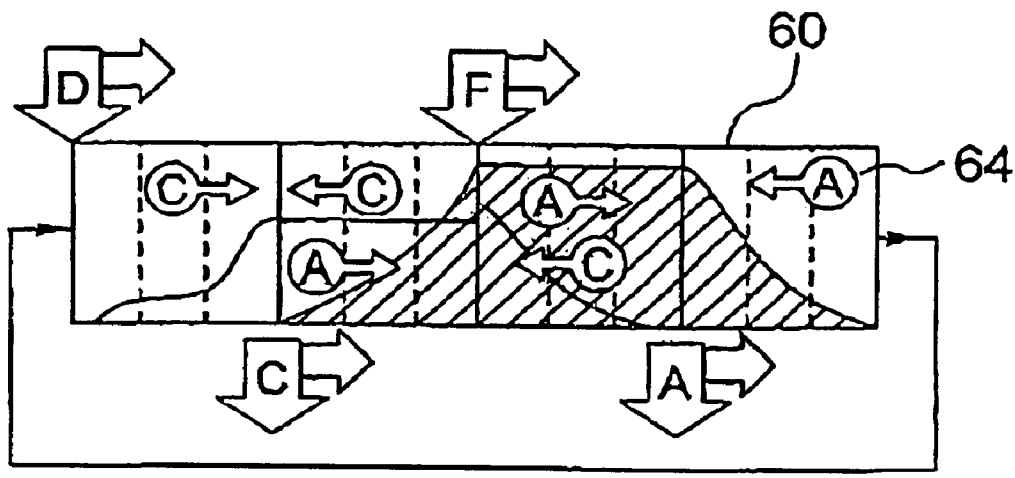
FIG. 5 is a schematic cross-sectional view of a separation vessel, showing the principle of a typical simulated moving-bed chromatographic separator.

FIG. 2 is a schematic perspective view illustrating the vicinity of the rotary valve of the above chromatographic separator. The rotary valve 10 has a substantially flat-plate-shaped stationary member 11 and a disc-shaped rotary member 12 disposed rotatably on the top portion thereof. The stationary member 11 has a square flat-plate block 111 and a disc-shaped stationary hub 112 fixed thereon. The upper surface of the stationary hub 112 defines a stationary surface, which is in contact with the rotary surface of the rotary member 12. There are arranged side by side a number of nozzles (reference numeral 13 in FIG. 1) in the circumferential direction on the stationary surface and each of the nozzles 13 communicates with bosses 113 formed on the side of the flat plate block 111. As shown in FIG. 1, each of the bosses 113 is coupled to the corresponding pump 20 or 30 and to the corresponding tank 25, 35, 43, or 53.

The rotary member 12 has a gear 121 and a rotary hub 122 rotatably mounted on the upper surface thereof en bloc, the gear 121 being engaged with a smaller diameter gear 151 of a motor 152. There are arranged a number of bosses 123 on the upper surface of the rotary hub 122. Each of the bosses 123 communicates with one of the nozzles exposed on the rotary surface or the lower surface of the gear 121 and with the corresponding outlet port or inlet port of the columns 14 or the concentration sensor 17 via each of tubes 141. There is fixed a cylindrical support pillar 124 on the upper surface of the rotary hub 122 and two discs 125 are arranged spaced apart from each other in the vertical direction on the support pillar 124. The rotary member 12 is provided with eight vertical columns 14, each of the columns 14 being arranged side by side in the circumferential direction and supported by means of the two discs 125.

The concentration sensor 17 has a cylindrical body 171 of a larger diameter and a cylindrical current collector projection 172 of a smaller diameter fixed thereon, the cylindrical body portion 171 being supported on the upper end of the support pillar 124. There are arranged three slip rings 173 on the outer circumference of the current collector projection 172, each of the slip rings 173 being connected to an external cable 175 through a current corrector brush 174. The current corrector brush 174 is fixed by means of a support member which is not shown in the drawings. The concentration sensor 17 is connected to an external power supply source and a signal processing circuit, which are not specifically shown in the drawings, by means of the slip rings 173 and the current corrector brush 174.

In the above chromatographic separator, rotation of the motor 152 allows the rotary member 12 to rotate intermittently. The intermittent rotation of the rotary member 12 causes each of the columns 14 to be rotated by a distance corresponding to one column per one rotational movement. When the rotary valve 10 is at a standstill, the inlet port and outlet port of each of the columns 14 are coupled to the outlet port of the preceding column 14 and to the inlet port of the succeeding column 14, respectively, via respective nozzles of the rotary valve 10 in each of the circular path halves 16A and 16B.

FIG. 3 shows the operational state of the separator at each step in a tabular form. The separator repeats the following step sequentially. The steps include a first step, which lasts for about 20 seconds, for injecting the liquid eluent and discharging the component A, a second step, which lasts for about 20 seconds, for injecting the feed liquid material and discharging the component A, a third step, which lasts for about 40 seconds, for circulating an internal liquid flow, a fourth step, which lasts for about 40 seconds, for injecting the liquid eluent and discharging the component C, and a fifth step, which lasts for about 5 seconds, for bringing the internal liquid flow into a standstill while moving the rotary valve 10 together with the columns 14 (the separation vessel) by one column.

In the first step, with the first and second selector valves 23 and 33 being placed in the circulation mode and the liquid injection mode, respectively, and the valves 41 and 51 being opened and closed, respectively, the pumps 20 and 30 are activated. Thus, while the liquid eluent is being introduced, the component A is discharged. In the subsequent second step, both the first and second selector valves 23 and 33 are placed in the liquid injection mode, with the valves 41 and 51 remaining opened and closed, respectively, the first pump 20 is activated whereas the second pump 30 is stopped. Thus, while the feed liquid material is being introduced, the component A is discharged. In the subsequent third step (circulation step), both the first and second selector valves 23 and 33 are placed in the circulation mode, with the valves 41 and 51 being closed, and the first and second pumps 20 and 30 are activated, whereby the internal liquid is allowed to circulate within the circular path. In the subsequent fourth step, with the first and second selector valves 23 and 33 are placed in the circulation mode and the liquid injection mode, respectively, the valves 41 and 51 are closed and opened, respectively, the first pump 20 is stopped and the second pump 30 is activated. Thus, while the liquid eluent is being injected, the component C is discharged. In the subsequent fifth step, both the first and second selector valves 23 and 33 are placed in the circulation mode, with the valves 41 and 51 being closed, both the first and second pumps 20 and 30 are stopped, and the rotary member 12 of the rotary valve 10 is rotated by a distance corresponding to one column in the counter clockwise direction, whereby the liquid supply positions and the liquid discharge positions are shifted by the distance corresponding to one column. Subsequently, by repeating the above steps, while the feed liquid material and the liquid eluent D are being injected, the components A and C are discharged.

A measuring signal of the concentration sensor 17 is referenced to perform fine tuning of the timings for shifting the liquid supply positions and the discharge positions and for switching between the liquid injection and liquid discharge by using the rotation of the rotary valve 10. In this case, the signal processing section measures the total concentration of the components A and C (alternatively, the single concentration of one of the components A and C may be measured) by means of the concentration sensor 17 starting from each time instant at which each step is switched. Then, it is determined if the measured concentration has reached a specified threshold concentration specified for that time during each step. In addition, the time length required to reach the threshold concentration since the start of the step is also measured. For example, when the specified threshold concentration has been reached and the measured time is substantially equal to the specified time, it is understood that a desired control has been conducted and the control remains unchanged to be continued. If the specified threshold value has not been reached within the specified time, the subsequent circulation step is given a longer length of time. In addition, if the concentration has reached the specified threshold value with the measured time being short, such control is conducted so as to reduce the time length for the subsequent circulation step.

The present embodiment allows an intermittently-moving-bed chromatographic separator to measure effectively the concentration of components in the internal liquid flowing in the circular path by means of a single concentration sensor without using a dedicated rotary valve. Fine tuning of each step can be implemented and thus the intermittently-moving-bed chromatographic separator can provide improved separation performance. The chromatographic separator according to the present invention is particularly suitable for a small chromatographic separator wherein a fine control is generally difficult in the conventional technique.

In the foregoing embodiment, a configuration that employs the rotary valve having a flat-plate-shaped sliding surface is exemplified. However, the rotary valve is not limited to this type and may have a cylindrical sliding surface.

Furthermore, in the foregoing embodiment, the shape and structure of each constituent element or the framework of the s time length of each step and the order of the steps have been described merely as an example, while various alterations and modifications can be made therefrom.

What is claimed is:

1. An intermittently-moving-bed chromatographic separator comprising:

a rotary valve including a stationary member having a substantially cylindrical or disc surface mounting thereon a plurality of stationary nozzles, and a rotary member having a rotary surface slidably rotating on said cylindrical or disc surface intermittently at a specified timing, said rotary surface mounting thereon rotary nozzles intermittently communicated with said stationary nozzles, said rotary member supporting at least four columns en bloc each having an inlet port and an outlet port so that said rotary nozzles are communicated with said inlet ports and said outlet ports, said stationary nozzles being coupled by a tube assembly to couple said columns in a circular path;

first and second injection tubes for introducing a feed liquid material including first and second components and for introducing a liquid eluent, respectively;

first and second discharge tubes coupled to said circular path to discharge said first and second components, respectively, from said first circular path; and a concentration sensor supported by said rotary member in unison to be coupled to said circular path, said concentration sensor having an external terminal connected through a combination of slip-ring and a current collector to the outside.

* * * * *